Nov. 26, 1968

J. B. WATT 3,412,757

MIXING VALVE FOR COLD AND HOT LIQUIDS

Filed June 28, 1965

James B. Watts
INVENTOR

BY Eugene D. Farley

Atty.

United States Patent Office 3,412,757
Patented Nov. 26, 1968

3,412,757
MIXING VALVE FOR COLD AND HOT LIQUIDS
James B. Watts, Portland, Oreg., assignor, by mesne assignments, to McElligott Enterprises, Anchorage, Alaska
Filed June 28, 1965, Ser. No. 467,464
2 Claims. (Cl. 137—606)

ABSTRACT OF THE DISCLOSURE

A hollow one-piece valve body has a central mixing chamber with which communicates hot and cold water inlet ports and an exhaust port. An adjustable cold water check valve in the chamber seats resiliently against an internal seat in the cold water inlet port. A connecting nipple secured removably to the body at the hot water inlet port has an external seat for an adjustable needle valve and an internal seat for a reverse flow check valve in the mixing chamber confined movably between the latter seat and the cold water check valve.

---

This invention relates to valves for mixing cold and hot liquids in predetermined proportions. It pertains particularly to a mixing valve for use in preventing the sweating of a water closet tank by admitting water at a controlled temperature into the tank. The invention is described herein with particular reference to such use, although no limitation thereby is intended.

It is the primary object of the present invention to provide a mixing valve by means of which two liquids of different temperature may be mixed accurately in controlled and adjustable proportions.

Another object of the present invention is the provision of a mixing valve of simple construction which may be used as an accessory for a water closet tank for controlling the temperature of water supplied to the tank.

Another object of the present invention is the provision of a mixing valve for use in pressurized hot and cold water lines which valve is provided with means for preventing the inadvertent flow of water from one of the lines into the other of the lines should the pressure in the latter inadvertently be reduced.

It is another object of the present invention to provide a mixing valve for hot and cold water which may be used to control the temperature of water introduced into a water closet tank and thus preventing the external sweating of the tank.

Figure 1:
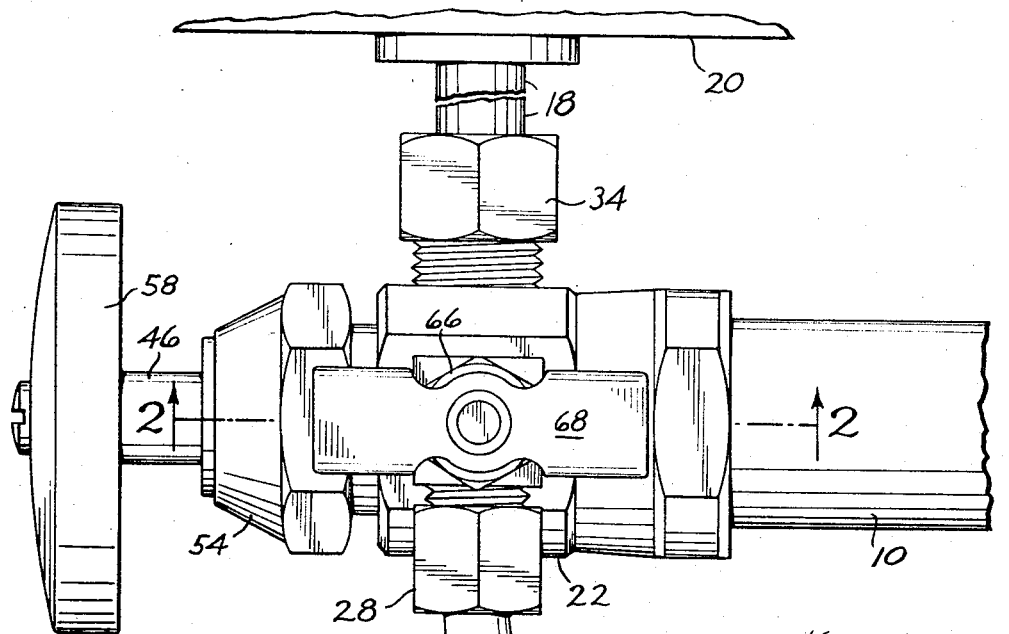
FIG. 1 is a view in elevation.

Generally stated, the hot and cold liquid mixing valve of my invention comprises a hollow valve body having a central mixing chamber. A cold liquid inlet port communicates with the chamber and connects with a conduit conveying cold liquid under pressure.

A hot liquid inlet port communicates through an elongated passageway with the chamber and connects with a conduit conveying hot liquid under pressure. An exhaust port communicates with the chamber and connects with a conduit for conveying mixed liquid at the predetermined temperature away from the chamber.

An internal valve seat is present in the chamber, across the cold liquid inlet port. A spring-pressed check valve is seated in the valve seat and arranged to admit cold liquid directly into the chamber.

An external valve seat is present on the outer end of the passageway. An externally controlled needle valve works in the valve seat and is arranged to admit hot liquid directly into the passageway.

A check valve is seated in the inner end of the passageway and is arranged to check the flow of liquid outwardly therethrough when the pressure in the hot liquid pressure conduit is less than the pressure in the chamber.

Thus by regulating the relative proportions of hot and cold liquid introduced into the chamber and passed outwardly through the exhaust port, a source of liquid of controlled and predetermined temperature is provided. The liquid then may be conveyed to the flush tank of a water closet where its use controls the sweating problem which frequently is present.

Considering the foregoing in greater detail and with particular reference to the drawings:

In the illustrated form of the invention, the valve is applied to the mixing of cold water supplied by a branch conduit 10 having a threaded end and communicating with the pressurized house cold water line. It is supplied with hot water through a branch conduit 12 which is tapped into the pressurized house hot water line 14, the connection being made through the conventional packing gland 16. The mixed liquids leaving the valve pass through an exhaust conduit 18 which discharges into a reservoir 20. As indicated above, this may be a water closet flush tank.

The mixing valve includes a valve body 22 having a central chamber 23 provided with ports for communication with these various conduits. It thus is provided with a cold water inlet port 24 having an associated threaded section for engagement with the threaded end of cold water conduit 10.

It is provided further with a hot water inlet port 26 which is connected through packing gland 28 to hot water line 12 and which communicates with chamber 23 through an elongated passageway 30 provided in nipple 32.

The cold water inlet port of the valve is provided with an internal valve seat 36 seating a check valve 38 which is arranged to admit cold water directly into chamber 23 when the water pressure in conduit 10 exceeds the pressure within the chamber.

Check valve 38 is spring-pressed and adjustable. It is actuated by adjustment of a valve step formed in two shouldered, telescoping sections. An inner stem section 40 forms with the valve head a shoulder 42. An axial extension 44 of reduced diameter extends from the inner stem section in a direction away from the valve head.

The inner end of the outer section 46 of the valve stem is provided with an axial bore 48 having a diameter such that it receives in sliding relation reduced extension 44 of inner valve stem section 40. Outer valve stem section 46 further is provided with an annular threaded segment 50 which provides an inner shoulder 52 and which is threaded into the bore of the valve body.

The outer portion of valve stem section 46 passes through a packing nut 54 with associated packing elements 56, 57. It terminates in a handle 58.

A compression spring 60 is mounted on the telescoping parts of valve stem sections 40, 46 between shoulders 42, 52. Accordingly, by turning handle 58, the force exerted by spring 60 against valve head 38 may be varied as desired to control the pressure at which cold water will be admitted to the interior of the valve body through cold water line 10.

To control the flow of hot water through hot water port 26 and associated passageway 30, there is provided an external valve seat 62 and associated needle valve 64. The latter works through packing nut 66 and is actuated by means of handle 68.

A particular problem is presented in mixing valves of the class described herein in that hot water conduit 12, which introduces hot water into the valve body is a spur line leading from a pressurized house line 14. Since house line 14 serves other water outlets, the pressure in conduit 12 may be reduced materially when hot water is discharged from the associated outlets. In the absence of a preventive appliance, cold water then could run through chamber 23, spur conduit 12 and thence into house line 14. Its presence there undesirably would chill the hot water contained in the house line.

Accordingly check valve means are provided for preventing the inadvertent transfer of cold water from house line 10 into hot water contained in house line 14 when the pressure in the latter line is reduced.

Figure 2:
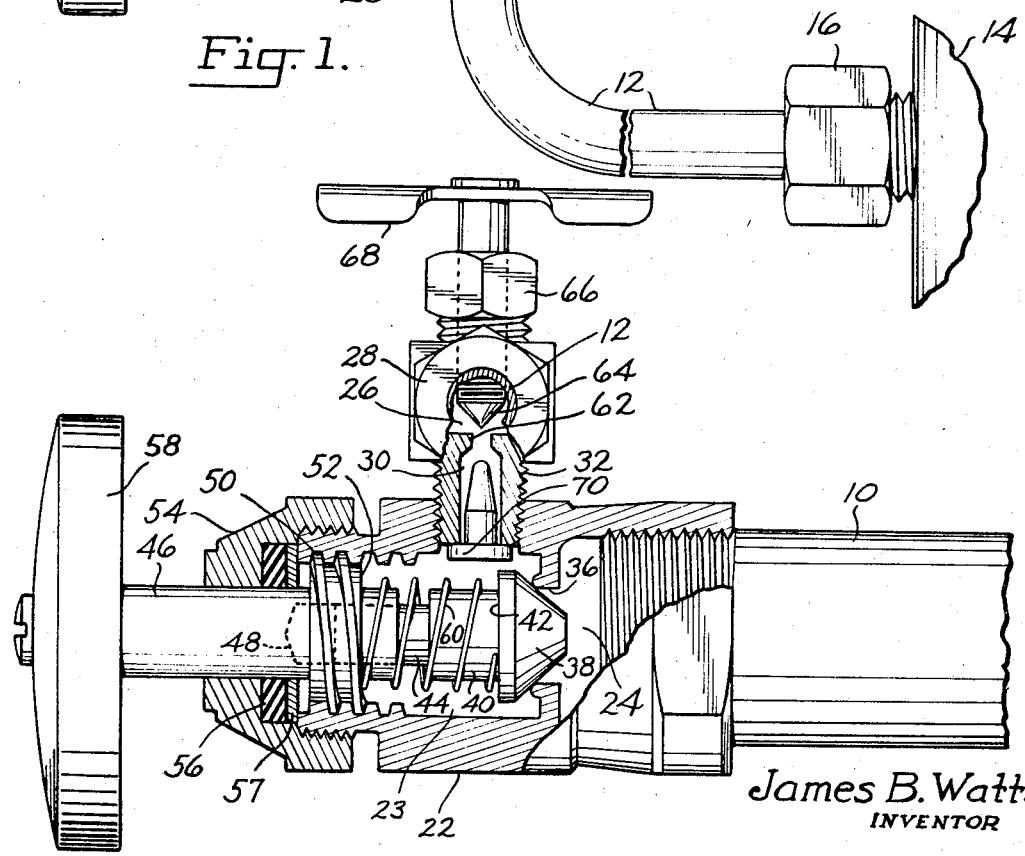
FIG. 2 is a longitudinal sectional view, taken along line 2—2 of FIG. 1, of the mixing valve of my invention.

The means employed for this purpose comprises a check valve 70 working in passageway 30 and seated across the inner opening thereof. By reference to FIG. 2, it will be observed that the check valve floats in the passageway, being retained by abutment of its head first with the end wall of nipple 32 and second with the side wall of valve head 38.

In its use, the valve is installed in the desired location, for example, between cold water house line 10 and exhaust conduit 18 feeding a reservoir such as water closet flush tank 20. A spur hot water conduit 12 is connected to the valve and tapped into the hot water house line 14.

Handle 58 is adjusted as desired to control the pressure at which valve 38 will open to admit cold water into the interior chamber 23 of the valve body. Handle 68 is adjusted as required to adjust needle valve 64 to admit the predetermined amount of hot water.

When the pressure in exhaust line 18 is reduced, as occurs when the water is discharged from tank 20, cold and hot water will flow into chamber 23 in a proportion determined by the settings of the respective associated valves. There the cold and hot water are mixed and conveyed through exhaust conduit 18 to tank 20. This continues until the flow is cut off in the usual manner, as for example by means of a float valve located in the tank. Since the water is at a controlled and somewhat elevated temperature, sweating of the tank is avoided.

Also, in the event that demands from other sources reduce the pressure in hot water house line 14 below the pressure in cold water house line 10, as regulated by spring-pressed valve 38, passage of cold water through chamber 23, through passageway 30, through spur conduit 12 and thence into the hot water house line is prevented.

In this manner there is provided a simple but effective and readily adjustable hot and cold water mixing valve suitable for use in many installations and particularly in controlling the temperature of water introduced into a water closet flush tank.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:
1. A mixing valve for cold and hot liquids comprising
   (a) a hollow one-piece valve body having a central mixing chamber,
   (b) a cold liquid inlet port integral with the body communicating with the chamber,
   (c) connecting means for connecting the cold liquid inlet port and a conduit conveying cold liquid under pressure into the chamber,
   (d) a hot liquid inlet port integral with the body communicating with the chamber,
   (e) connecting means secured removably to the body at the hot liquid inlet port and having an elongated passageway therethrough for connecting the hot liquid inlet port and a conduit conveying hot liquid under pressure into the chamber,
   (f) an exhaust port communicating with the chamber,
   (g) connecting means for connecting the exhaust port and a conduit conveying mixed liquid away from the chamber,
   (h) an internal valve seat in the chamber across the cold liquid inlet port,
   (i) a spring pressed cold water check valve in the chamber seated in the valve seat and arranged to admit cold liquid directly into the chamber,
   (j) an external valve seat on the outer end of the passageway of the removable hot liquid inlet connecting means,
   (k) externally controlled hot water needle valve means working in the valve external seat and arranged to admit hot liquid directly into the passageway, and
   (l) a reverse flow check valve seated in the inner end of the passageway of the removable hot liquid inlet connecting means and arranged to check the flow of liquid outwardly therethrough when the pressure in the hot liquid conduit is less than the pressure in the chamber.

2. The mixing valve of claim 1 wherein the reverse flow check valve is confined movably between its associated seat and the spring pressed cold water check valve.

References Cited

UNITED STATES PATENTS

| | | | |
|---|---|---|---|
| 2,716,424 | 8/1955 | Watts | 137—337 X |
| 2,741,258 | 4/1956 | Bletcher et al. | 137—606 X |
| 2,755,633 | 7/1956 | McClain | 137—340 |
| 2,758,610 | 8/1956 | Hively | 137—334 X |
| 2,830,612 | 4/1958 | Taylor | 137—337 |
| 2,900,645 | 8/1959 | Rom | 137—337 X |
| 2,915,080 | 12/1959 | Holmes | 137—337 X |

SAMUEL SCOTT, *Primary Examiner.*